US009395276B2

(12) United States Patent
Kristen et al.

(10) Patent No.: US 9,395,276 B2
(45) Date of Patent: Jul. 19, 2016

(54) METHOD AND SYSTEM FOR DETECTION AND ANALYSIS OF RAILWAY BOGIE OPERATIONAL PROBLEMS

(71) Applicant: Railway Metrics and Dynamics Sweden AB, Stockholm (SE)

(72) Inventors: Helmuth Kristen, Lund (SE); Jack R. Long, Boca Raton, FL (US); Jan Lindqvist, Stockholm (SE)

(73) Assignee: RAILWAY METRICS AND DYNAMICS SWEDEN AB, Stockholm (SE)

( * ) Notice: Subject to any disclaimer, the term of this patent is extended or adjusted under 35 U.S.C. 154(b) by 0 days.

(21) Appl. No.: 14/363,108

(22) PCT Filed: Dec. 7, 2012

(86) PCT No.: PCT/EP2012/074811
§ 371 (c)(1),
(2) Date: Jun. 5, 2014

(87) PCT Pub. No.: WO2013/083786
PCT Pub. Date: Jun. 13, 2013

(65) Prior Publication Data
US 2015/0051792 A1 Feb. 19, 2015

(30) Foreign Application Priority Data

Dec. 7, 2011 (EP) .................................... 11192341

(51) Int. Cl.
*B61K 9/12* (2006.01)
*G01M 17/00* (2006.01)
(Continued)

(52) U.S. Cl.
CPC ................. *G01M 17/10* (2013.01); *B61K 9/12* (2013.01); *B61L 99/00* (2013.01); *G01M 17/08* (2013.01); *B61K 9/00* (2013.01); *G01M 17/00* (2013.01)

(58) Field of Classification Search
CPC ............ B61K 9/12; B61K 9/00; B61L 99/00; G01M 17/10; G01M 17/08; G01M 17/00; B61F 9/005
USPC ........................ 701/19, 29.1, 33.4, 34.2, 34.4; 73/117.01, 117.03; 246/169 R, 169 S
See application file for complete search history.

(56) References Cited

U.S. PATENT DOCUMENTS 4,058,279 A 11/1977 Frielinghaus
4,119,284 A 10/1978 Belmont
(Continued)

FOREIGN PATENT DOCUMENTS

DE 198 26 422 A1 12/1999
EP 1 197 417 A1 4/2002
(Continued)

OTHER PUBLICATIONS

International Search Report (PCT/ISA/210) mailed on Mar. 25, 2013, by the European Patent Office as the International Searching Authority for International Application No. PCT/EP2012/074811.

*Primary Examiner* — Russell Frejd
(74) *Attorney, Agent, or Firm* — Buchanan Ingersoll & Rooney P.C.

(57) ABSTRACT

A method and system for detecting defects to railway wagon wheels and to the rail. A method for detecting a wheel flat, or an event that may cause a wheel flat to develop on a railway wagon, including the steps of a) monitoring at least the longitudinal and vertical acceleration of said railway wagon, and b) concluding that a wheel flat has developed, or that there is a risk of developing a wheel flat, if a specific acceleration pattern is monitored, said pattern comprising a longitudinal acceleration above a first threshold followed by a vertical acceleration above a second threshold. A system for detecting a wheel flat of at least one wheel of a railway wagon and the use of an acceleration sensor mounted on the sprung part of a railway wagon for estimating the wheel flat size of a wheel of the railway wagon.

16 Claims, 12 Drawing Sheets

(51) Int. Cl.
  *G01M 17/10* (2006.01)
  *G01M 17/08* (2006.01)
  *B61L 99/00* (2006.01)
  *B61K 9/00* (2006.01)

(56) References Cited

U.S. PATENT DOCUMENTS

| | | |
|---|---|---|
| 4,129,276 A | 12/1978 | Svet |
| 4,274,776 A * | 6/1981 | Paton et al. ................ 410/57 |
| 4,493,042 A | 1/1985 | Shima et al. |
| 4,696,446 A | 9/1987 | Mochizuki et al. |
| 4,781,060 A | 11/1988 | Berndt |
| 4,812,826 A | 3/1989 | Kaufman et al. |
| 5,150,618 A | 9/1992 | Bambara |
| 5,356,098 A | 10/1994 | Post |
| 5,433,111 A | 7/1995 | Hershey et al. |
| 5,438,322 A | 8/1995 | Martin et al. |
| 5,561,242 A | 10/1996 | Naumann et al. |
| 5,633,628 A | 5/1997 | Denny et al. |
| 7,034,711 B2 | 4/2006 | Sakatani et al. |
| 7,705,743 B2 | 4/2010 | Barone et al. |
| 2007/0152107 A1 | 7/2007 | LeFebvre et al. |
| 2008/0195265 A1 | 8/2008 | Searle et al. |
| 2009/0001226 A1 * | 1/2009 | Haygood ................ 246/169 S |
| 2010/0078527 A1 | 4/2010 | Burkhart et al. |
| 2010/0116041 A1 * | 5/2010 | Wach et al. ................ 73/117.01 |

FOREIGN PATENT DOCUMENTS

| | | |
|---|---|---|
| JP | 5-306970 A | 11/1993 |
| WO | WO 2008/141775 A1 | 11/2008 |

* cited by examiner

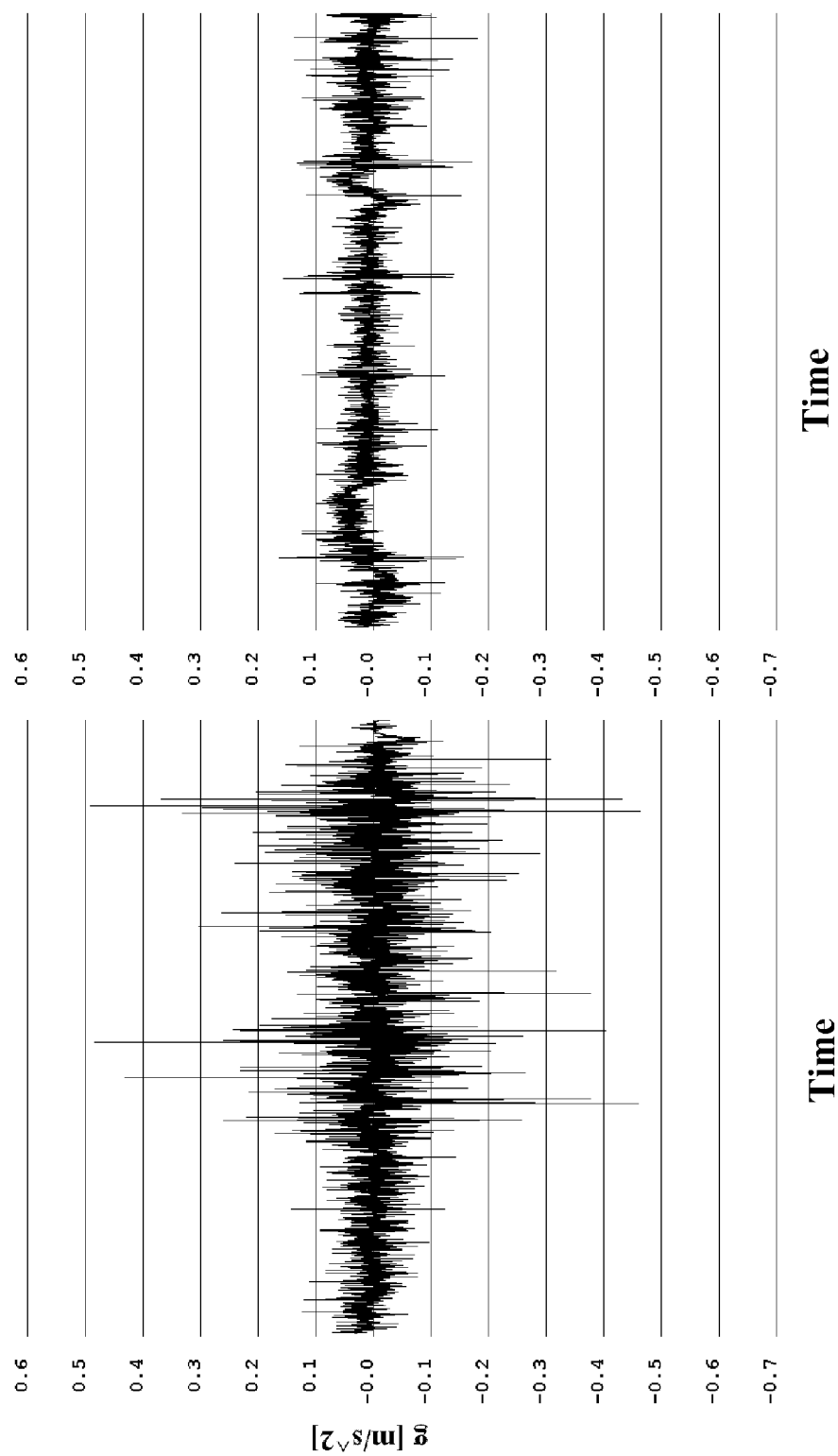

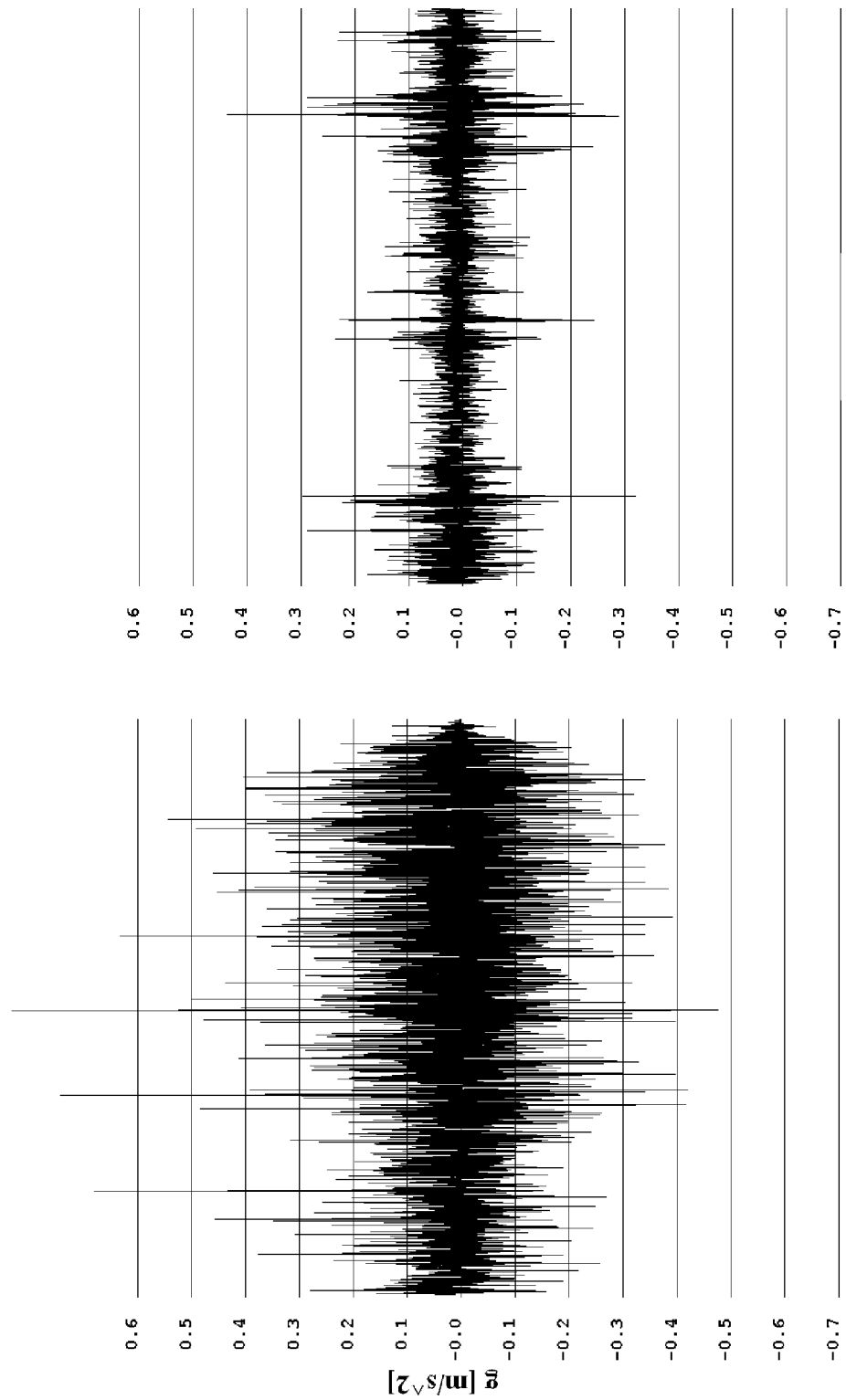

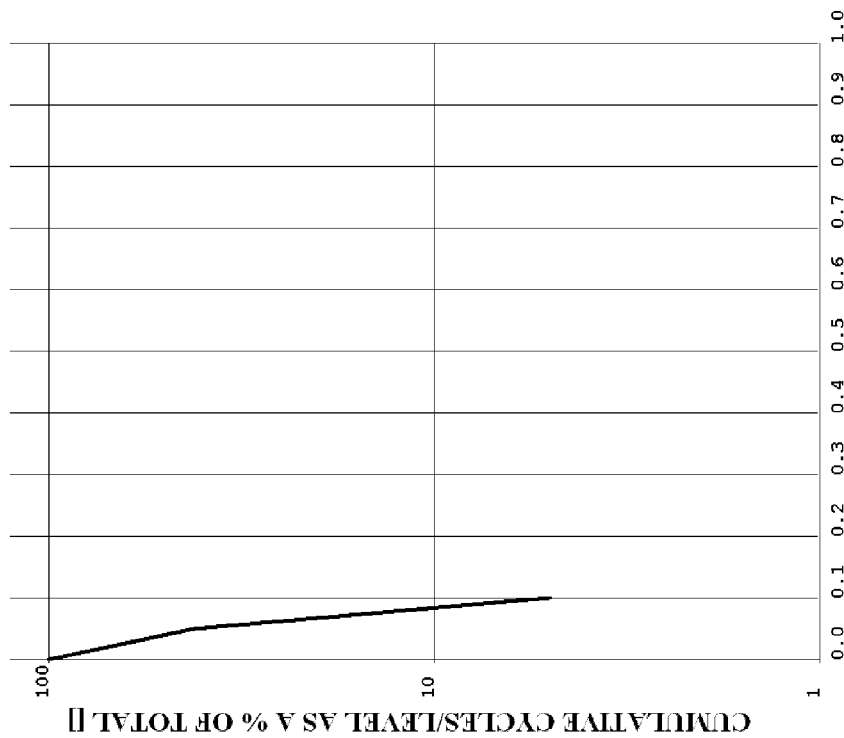
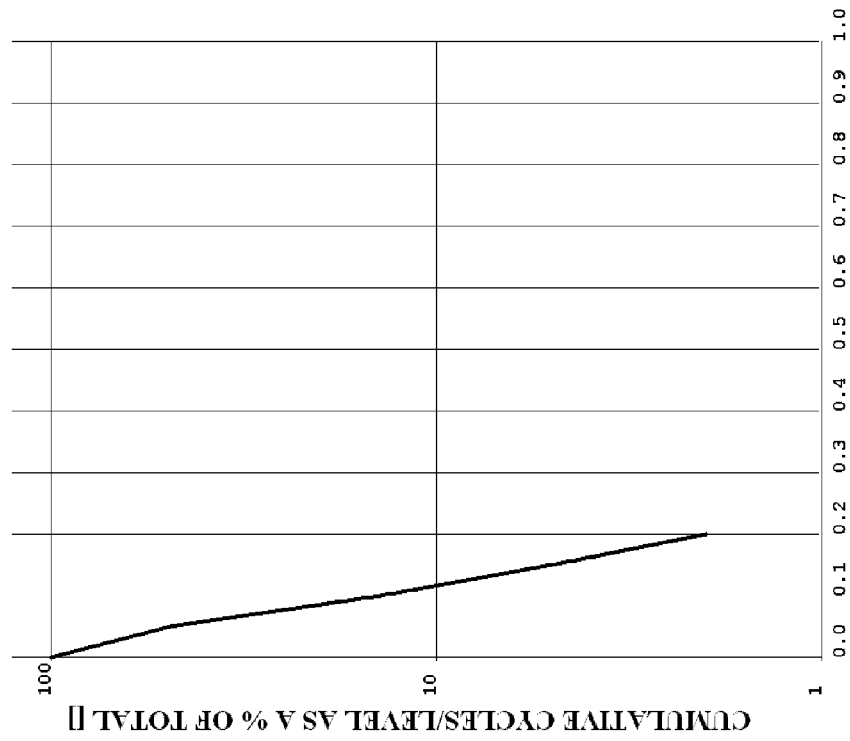

METHOD AND SYSTEM FOR DETECTION AND ANALYSIS OF RAILWAY BOGIE OPERATIONAL PROBLEMS

TECHNICAL FIELD OF THE INVENTION

The present invention relates to a method and system for detecting defects to the wheels and to the rail. The invention further relates to a system of diagnosing railway bogies problems or defects, such as wheel flats, and the analysis and communication of the findings.

BACKGROUND ART

Periodic unacceptable high forces generated by the wheel-rail interaction of a moving railway wagon may be harmful to the wheels, the bogies, the wagon and the rail. If the wagon operates with defective bogies, including flat wheels, over a period of time, the resultant damage may be costly in terms of wheel or rail wear or in extreme cases result in dangerous derailments. The degree of this danger may be much more severe if the railway wagon carries hazardous material.

Technology has been developed to monitor performance characteristics of a railway wagon and the rail track in order to detect conditions that may cause damage or derailment. For example, the truck/bogie performance has been measured by utilizing wayside sensing, which measure forces at the wheel-rail interface. The wayside technology may measure and detect bogies or wheel sets that are not performing correctly, and communicate this information back to a central office, so that the bogies or wheel sets could be removed for service and inspection. This technology has inherent disadvantages, however, in terms of costs and the multiple locations across large rail systems required to identify the wagons that are not performing safely.

A wheel flat (also known as flat spot) is a well-known defect related to the tread shape of a railroad wheel, which decreases the roundness of a wheel. A wheel flat may for example develop if the wheel set of a railroad wagon is being dragged along the rail after the wheel-axle set has stopped rotating. Faulty brakes or faulty wheel set bearings, or other conditions that causes the wheel to lock up while the railroad wagon is still moving, may thus cause a wheel flat. Often, a wheel set must be replaced or the wheel set turned if a large flat spot is detected, since a wheel flat may cause serious derailment.

To summarize, for safety reasons, there is a need in the art for a method of detecting a wheel-flat at an early stage so that required actions may be performed to preclude derailment.

SUMMARY OF THE INVENTION

It is an object/aim of the present invention to provide a method and a system for detecting wheel defects, rail defects and derailing. It is a further object to provide a method for detecting a wheel flat, or events that may cause a wheel flat as well as a robust stand-alone unit that can be mounted on a railway wagon and that detects unsafe conditions which can lead to damaging events.

As a first aspect of the invention, there is provided a method for detecting a wheel flat, or an event that may cause a wheel flat to develop, in a railway wagon, comprising the steps of
a) monitoring at least the longitudinal and vertical accelerations of the railway wagon, and
b) concluding that a wheel flat has developed, or that there is a risk of developing a wheel flat, if a specific acceleration pattern is monitored, the pattern comprising a longitudinal acceleration above a first threshold followed by a vertical acceleration above a second threshold.

The longitudinal acceleration refers to the acceleration in a direction generally parallel with the railroad track, and the vertical acceleration is the acceleration along an axis substantially perpendicular to the horizontal plane, i.e. substantially perpendicular to the longitudinal axis.

The first aspect of the invention is based on the insight that a developed wheel flat or events that may cause a wheel flat, will give rise to a specific acceleration pattern as seen in the longitudinal and vertical acceleration. Thus, the inventors have found that the development of a wheel flat is accompanied by a high longitudinal acceleration, such as an acceleration above a specific threshold, associated with the forming of the wheel flat, immediately followed by a high vertical acceleration caused by the formed wheel flat, such as a vertical acceleration above another threshold.

The first and second thresholds may have been determined from empirical data.

The first aspect of the invention thus provides a convenient method for detecting wheel flats, and may thus raise an alarm before further damage, such as wheel derailment, occurs.

It is to be understood that more than the longitudinal and vertical acceleration may be measured. As an example, the acceleration along three mutual orthogonal axes of the railway wagon, wherein two of the axes correspond to the vertical and longitudinal acceleration, respectively, may be measured in step a).

The measured acceleration may for example be the momentary acceleration. This may thus give continual information on whether or not a wheel flat has developed.

It is further to be understood that step a) may be performed continually and the step of concluding that a wheel flat has developed, or that there is a risk of developing a wheel flat, may trigger other events, such as a more frequent detection of acceleration or estimating the size of the wheel flat. As an example, step b) may trigger measuring the acceleration along three mutual orthogonal axes of the railway wagon, wherein two of the axes correspond to the vertical and longitudinal acceleration, respectively, and further estimating the absolute value of the acceleration vector and estimating the size of the wheel flat based on the absolute acceleration vector.

Consequently, the specific acceleration pattern may function as a trigger event for more detailed monitoring of the acceleration.

In embodiments of the first aspect, the accelerations of step a) are monitored on the sprung part of the railway wagon.

The sprung part of a railway wagon may for example be on the bogie of the railway wagon, such as on the bogie and in the centre of the railway wagon. The acceleration may also be measured inside a railway wagon, such as close to or on the floor, which also is on the sprung structure.

Consequently, the acceleration may be measured at the sprung structure of the railway wagon, in the general area where the wagon structure connects to an axle or a bogie. The inventors have found that normal acceleration levels experienced by this part of the wagon are within 0-0.5 g. Acceleration levels experienced by this part of the wagon following a wheel derailment or a wheel flat tend to be within 0-1.0 g, obviously more in the case of severe or catastrophic derailment. This is further demonstrated in Example 1.3 below. Thus, the inventors have found that it is advantageous to measure the acceleration on the sprung part of the wagon, since it requires less rugged measurement equipment and since it facilitates installation considerably.

The acceleration may also be measured on the unsprung parts, such as parts attached to the wheel axle. This may provide for directly relating the measured acceleration with the size of the wheel flat, using input of e.g. the acceleration and the diameter of the wheels.

In embodiments of the first aspect of the invention, the method is further comprising the step of c) estimating the size of the wheel flat by comparing at least one measured acceleration of step a) with predefined criteria that correspond to different wheel flat sizes.

Estimating the size of the wheel flat is advantageous since this provides for different actions depending on the size of the wheel flat. Different wheel flat sizes may require different safety actions and it is very important that the train driver acts according to the wheel flat size, since otherwise the railroad track itself may be damaged. If for example the wheel flat is severe, the train may need to stop for immediate service whereas a minor wheel flat may only require extra service during standard service routines or require that the train is driven below a certain speed. In other words, there may be no need for stopping an entire train immediately if a wheel flat has developed, given that the train driver is aware of the wheel flat size.

In embodiments of the first aspect, the predefined criteria of step c) are predefined acceleration levels or intervals that correspond to different wheel flat sizes.

As an example, a low predefined g-level may correspond to a small wheel flat and a higher predefined g-level may correspond to a larger wheel flat. As an example, the vertical acceleration may be compared in step c) with predefined criteria that correspond to different wheel flat sizes.

Thus, the magnitude or pattern of the vertical acceleration may be used for estimating the wheel flat size. Thus, step c) may comprise comparing the vertical acceleration with predefined vertical acceleration levels. The vertical acceleration may for example be the momentary vertical acceleration, an integrated vertical acceleration etc.

A step of estimating the wheel flat size by comparing the results from step a) with predefined values means that the results from the estimation of the acceleration may be used as a "fingerprint" that is compared with predefined acceleration values, wherein different predefined values or "fingerprints" correspond to different wheel flat sizes. Thus, previous empirical data may be used to calibrate the method with information of what results obtained from step b) that correspond to the different wheel flat sizes. Thus, the step of "comparing with predefined values" may include a linear or non-linear fit of monitored acceleration data to different calibration functions.

In embodiments of the first aspect, step a) comprises monitoring the acceleration along three mutual orthogonal axes of the railway wagon, wherein two of the axes correspond to the vertical and longitudinal acceleration, respectively, and further estimating the absolute value of the acceleration vector from the monitored acceleration, and step c) comprises estimating the wheel flat size by comparing the estimated acceleration vector of step a) with predefined criteria that correspond to different wheel flat sizes.

In step a) the acceleration may thus be measured in the direction along three mutual orthogonal axes, i.e. in three perpendicular directions. One direction may thus be along the vertical axis that is generally perpendicular to the horizontal plane.

As discussed above, the acceleration vector may be determined or measured after a trigger event, e.g. that the specific acceleration pattern in the longitudinal and vertical acceleration is detected.

The absolute value of the acceleration vector is defined as $\sqrt{(x^2+y^2+x^2)}$, wherein x, y and z is the acceleration along the three mutual orthogonal axes x, y and z. This is advantageous since it provides a robust measure of the acceleration that may be used for estimating the wheel flat size. Measuring the acceleration in the direction along three mutual orthogonal axes and further comparison with predefined values may give information related to the wheel flat size.

As an example, the predefined criteria may be a specific increase in the absolute value of the acceleration vector, such as a specific increase that is withheld during a specific period of time. Different increases of the absolute value of the acceleration vector may thus correspond to different wheel flat sizes.

Measuring or estimating the acceleration vector may comprise estimating the momentary absolute value of the acceleration vector at the frequency at which the acceleration is monitored in step a).

Thus, to clarify, the method of the first aspect of the invention may comprise a1) monitoring the acceleration along three mutual orthogonal axes of the railway wagon, wherein two of the axes correspond to the vertical and longitudinal acceleration, respectively, a2) further estimating the absolute value of the acceleration vector from the monitored acceleration of step a1), b) concluding that a wheel flat has developed, or that there is a risk of developing a wheel flat, if a specific acceleration pattern is monitored, the pattern being a longitudinal acceleration above a first threshold followed by a vertical acceleration above a second threshold, and c) estimating the wheel flat size by comparing the estimated acceleration vector of step a2) with predefined criteria that correspond to different wheel flat sizes.

As discussed above, steps a1) and a2) may be performed continuously, or step a2), as well as step c), may be performed after step b), i.e. step b) may function as a trigger event for step a2) and step c).

The acceleration of step a) may for example be measured at a frequency of 20 Hz. The absolute value of the acceleration vector may be measured at the same frequency, and the momentary absolute value of the acceleration vector may thus be used to estimate the wheel flat size. The momentary acceleration may also be monitored in order to differentiate between wheel flats of the wheels of the railway wagon and defects of the railroad track. Defects to the railroad track will cause a momentary change in acceleration levels whereas a wheel flat will cause a change in acceleration during a prolonged period of time.

Consequently, in a configuration of the first aspect of the invention, there is provided a method for detecting defects to the railroad track, comprising a) monitoring at least the longitudinal and vertical accelerations of a railway wagon travelling on the railroad track, and b) concluding that there is a defect to the railroad track if a specific momentary acceleration pattern is monitored, the momentary pattern being a longitudinal acceleration above a first threshold followed by a vertical acceleration above a second threshold.

This configuration may further comprise measuring the geographical coordinates of the railroad wagon, such that the geographical coordinates of the defect may be estimated, and such that it can be determined whether the measured acceleration coincides with a geographically fix position, perhaps detected earlier or later-on by other systems of the same type. The geographical coordinates may for example be measured by means of a GPS system.

Further, measuring or estimating the acceleration vector may comprise estimating the maximum absolute value of the acceleration vector during a specific period of time.

Thus, the momentary absolute value of the acceleration vector may be measured during a specific time interval, and this maximum value may be used in step c) for estimating whether a wheel flat has developed and also the wheel flat size by comparing the maximum value with predefined acceleration intervals or levels.

Moreover, measuring or estimating the acceleration vector may comprise estimating the integrated absolute value of the acceleration vector during a specific period of time.

The integrated absolute value of the acceleration vector may thus be the sum of the momentary absolute values of the acceleration vector measured during a specific time interval. The integrated value may then be compared with predefined levels or intervals in step c) to determine the size of any wheel flat.

Measuring or estimating the acceleration vector may also comprise estimating the average absolute value of the acceleration vector during a specific period of time.

The average absolute value of the acceleration vector may thus be measured as the average of the momentary absolute values of the acceleration vector measured during a specific time interval. This average may then be compared in step c) with predefined levels or intervals to determine the size of any wheel flat.

In the embodiments described above, the "specific period of time" may be a long enough time interval such that any damage to the railroad track that causes a shift in the monitored accelerometer (a railroad track damage may cause a momentary increase in measured acceleration) may be neglected.

The specific period of time may for example be over about 5 s.

It is also to be understood that e.g. both the momentary acceleration as well as the integrated acceleration, an average acceleration and/or a maximum value of the acceleration may be monitored and estimated. This may e.g. allow for detecting both defects to the railroad track, causing changes in the momentary acceleration, and the wheel flat size, which may be seen as a change in e.g. the integrated acceleration over a specific period of time.

As an example of the above embodiments, a result from step c) of a g measured over time interval $\Delta t$, wherein a may be the maximum absolute value of the acceleration vector over $\Delta t$, the integrated absolute value of the acceleration vector over $\Delta t$ or the average absolute value of the acceleration vector over $\Delta t$, is compared with g-levels $c1$ and $c2$ ($c1 < c2$). The levels of $c1$ and $c2$ may be determined based on empirical data and may be different depending on for which railway wagon the acceleration is measured. If a is below $c1$, it is concluded that no wheel flat has developed, if a is between $c1$ and $c2$, then a small wheel flat has developed, and if a is above $c2$, then a large wheel flat has developed.

As a further configuration of the first aspect of the invention, there is provided a method of detecting events that may cause a wheel flat, comprising the steps of a) monitoring at least the longitudinal acceleration of the railway wagon, and b) concluding that there is a risk of developing a wheel flat if a second acceleration pattern is monitored, the second acceleration pattern being an oscillating longitudinal acceleration.

Thus, this configuration of the first aspect is based on the inventors insight that an oscillating longitudinal acceleration indicates that there is a risk of developing a wheel flat. Such a scenario may for example be if the railway wagon has a locked brake, e.g. due to malfunction or ice formation. The inventors have found that the resulting force will cause an oscillating longitudinal acceleration which may be monitored and used as a warning to the train driver. This is advantageous in that it provides for actions to be taken before an actual wheel flat has developed.

The oscillating acceleration may be an acceleration that has a specific magnitude in the oscillations, such as oscillations between two predefined acceleration levels. These levels may be determined based on empirical data.

In a similar configuration of the first aspect of the invention, there is provided a method for detecting events that may cause a wheel flat in a railway wagon, comprising the steps of a) monitoring the acceleration along the direction of an axis substantially parallel with the railroad track b) comparing the acceleration with predefined acceleration levels, and c) if the monitored acceleration is above a specific acceleration level or within a predefined interval, concluding that there is a risk of developing a wheel flat.

In analogy with the configuration above, the inventors have found that the above configuration may detect events that may cause a wheel flat by monitoring the longitudinal acceleration of a railway wagon. If the railway wagon has a locked brake, e.g. due to malfunction or ice formation, the resulting force will cause a longitudinal acceleration which may be monitored and used as a warning to the train driver. This is advantageous in that it provides for actions to be taken before an actual wheel flat has developed.

In a further configuration of the first aspect, there is provided a method for estimating the wheel flat size of a railway wagon, comprising the steps of a) monitoring the acceleration in the direction along three mutual orthogonal axes of the railway wagon, b) estimating the absolute value of the acceleration vector from the monitored acceleration; and c) estimating the wheel flat size by comparing the results from step b) with predefined criteria that correspond to different wheel flat sizes.

As discussed above, the acceleration may be monitored on the sprung part of the railway wagon.

As a second aspect of the invention, there is provided a system for detecting a wheel flat of at least one wheel of a railway wagon, or an event that may cause a wheel flat to develop, comprising at least one sensor for monitoring at least the longitudinal and vertical accelerations of the railway wagon, and a control unit adapted to detect a specific acceleration pattern, the acceleration pattern comprising a longitudinal acceleration above a first threshold, followed by a vertical acceleration above a second threshold.

Terms and definitions used in connection with the second aspect of the invention are as defined in the first aspect above.

The system of the second aspect of the invention may thus be used in the method as defined by the first aspect above.

It is to be understood that a train may be equipped with several systems according to the present disclosure. The systems may be located in different railway wagons.

In the acceleration pattern, the vertical acceleration may immediately follow the longitudinal acceleration.

The sensor for monitoring the acceleration may be an accelerometer. The accelerometer refers to an electromechanical device that measures acceleration forces. Such forces measured by the accelerometer may be static, i.e. forces that do not change in direction or amplitude, or dynamic, i.e. forces that change. The constant force of gravity experienced on the earth's surface is static. Forces other than gravity may be static or dynamic. For example, vibrational movement in a rail wagon structure is associated with dynamic forces.

Consequently, in embodiments of the second aspect, the sensor is adapted to monitor static forces. This may determine the angle with which the railway wagon is tilted.

In embodiments of the second aspect, the sensor is adapted to monitor dynamic acceleration forces. By sensing dynamic acceleration forces, one can analyse the movement of the railway wagon.

The sensor or accelerometer may of course be adapted to measure both static and dynamic acceleration forces.

The sensor or accelerometer further measures acceleration in three mutual orthogonal axes, i.e. in three perpendicular directions. One direction may be along the generally vertical axis relative to the railroad track.

The sensor, or accelerometer, may be integrated within an electronics module or be an externally connected accelerometer.

In embodiments of the second aspect, the sensor or accelerometer has a digital output. A digital accelerometer tends to produce a pulse width modulated signal: A square wave of constant frequency may be produced, and the time interval during which the voltage is high corresponds to the acceleration measured.

Further, in embodiments of the second aspect, the sensor or accelerometer has an analogue output. An analogue accelerometer produces a continuous voltage that is proportional to the acceleration measured.

Whether to use an analogue or digital accelerometer may depend on the hardware of the control unit with which to interface the accelerometer. If for example a microcontroller with purely digital input is used, a digital accelerometer is the most straightforward solution. On the other hand, if a microcontroller with AD-conversion capability is used, such as a PIC family one, or even a completely analogue based circuit is used, analogue may be the preferred choice.

In embodiments of the second aspect, the control unit comprises a microcontroller.

The control unit may amplify and filter the acceleration signals and also store the monitored signals or processed signal in a storage unit.

The control unit may for example be a standard microcontroller or a more complex microprocessor, on a printed circuit board with an internal or external signal processor, such as BeagleBoard, BlackFin, IGEPv2.

The control unit may be sealed in a weather proof, corrosion resistant housing and may be connected to the sensor for measuring acceleration or other probes on one side through a water proof connector. This housing design allows the system to be used in an on-wagon environment where water or moisture, dust and dirt are a problem.

The system of the second aspect of the invention may be powered by means of an external battery, such as a lithium-ion battery. The system may also be powered by other means, for example by kinetic harvesting via a hubometer or portable wind power.

In the context of the present disclosure, the wheel flat size may be defined as the maximum decrease in radius found along the flat part of the wheel tread surface, i.e. which is damaged by abrasion. Such reduction of wheel radius may directly be converted into the size or area of the actual flat portion of the wheel.

The wheel flat size may also be expressed as the length of the flat part of the wheel tread surface, i.e. which is damaged by abrasion, as measured parallel to the rail.

In embodiments of the second aspect, the at least one sensor is adapted to measure acceleration levels of up to 3.0 g.

In embodiments of the second aspect, the at least one sensor is adapted to measure acceleration levels of 0-2.0 g, such as 0-2.0 g along three mutual orthogonal axes, wherein the vertical and longitudinal axes are two of those axes.

One "g" is the Earth's level of gravitational force at sea surface, i.e. 9.81 m/s$^2$.

The inventors have realized that acceleration measurements of up to about 3.0 g, may be sufficient to detect events such as a wheel derailment or a wheel flat. The sensor may for example be adapted to measure acceleration levels of 0-2.0 g along all three mutual orthogonal axes. Thus, the system of the second aspect may be equipped with rather non-complex accelerometers or sensors, but still be able to give information concerning the wheel flat size. The at least one sensor may also be adapted to measure maximum acceleration levels of up to 3.0 g, such as about 0-2.0 g along the three mutual orthogonal axes.

In embodiments of the second aspect, the sensitivity of the sensor is about 0.02 g. Such sensitivity or resolution may be enough or preferred for allowing the estimation of the wheel flat size.

In embodiments of the second aspect, the at least one sensor has a bandwidth of about 10 Hz.

The bandwidth relates to the possible number of independent acceleration level measurements per time unit. The inventors have found that a bandwidth of about 10 Hz may be enough for estimating the wheel flat size according to the present disclosure. Thus, little bandwidth may be required for the proposed system. However, a sensor or accelerometer having a larger bandwidth may be used. For vehicle control or vibration measurement, a 100 Hz bandwidth or more may be preferred. For detailed tilt sensing applications, a 50 Hz bandwidth may be enough.

In embodiments of the second aspect, the at least one sensor is adapted to be mounted on the sprung part of the railway wagon.

This means that the sensor does not need to be mounted on the axle or bogie of the railway wagon. The sprung part may be on the bogie of the railway wagon, such as on the bogie and in the centre of the railway wagon. The sprung part may also be inside a railway wagon, such as close to or on the floor. The sensor may for example be adapted to be mounted by magnetic means.

The sensor may be adapted to be mounted on the sprung part of the railway wagon, close to an axle or a bogie. Normal acceleration levels experienced by this part of the wagon are within 0-0.3 g. Acceleration levels experienced by this part of the wagon following a wheel derailment or a wheel flat tend to be within 0-1.0 g; obviously more in the case of severe or catastrophic derailment. Thus, the inventors have found that it is advantageous to mount the sensor or accelerometer on the sprung part of the wagon, since it requires less rugged measurement equipment and since it considerably facilitates installation. Thus, if the sensor is mounted on the sprung part of the railway wagon, the sensor may be adapted to measure acceleration levels of up to 3.0 g, such as about 0-2.0 g, such as about 0.1-1.5 g. As a further example, the sensor may be adapted to measure acceleration levels of about a 0.1-3.0 g, such as about 0.1-2.0 g, along three mutual orthogonal axes, wherein the vertical and longitudinal are two of those axes.

In embodiments of the second aspect, the control unit is mounted together with the sensor.

If for example the sensor is mounted on the sprung part of the railway wagon, also the control unit may be mounted together with the sensor on the sprung part of the railroad wagon. This means that the control unit may be composed of a simple circuit instead of e.g. a microprocessor. Further, by mounting the control unit together with the sensor, the power consumption may be decreased, i.e. the sensor and control unit consume little energy as long as no problems are identified. Thus, the system may have on-board algorithmic intelligence and may not require external data processing for estimating the wheel flat size.

In embodiments of the second aspect, the sensor or accelerometer is mounted directly on the axle or in the vicinity of an axle, and the control unit is mounted on the sprung part of the railway wagon. This could be an option in applications where more distinct acceleration signals are required.

In embodiments of the second aspect, the system is further comprising a wireless transceiver for transmitting acceleration data and/or information about the wheel flat.

The wireless transceiver may be mounted together with the at least one sensor and/or together with the control unit. If the sensor and control unit is mounted together, the wireless transceiver may transmit information about the wheel flat to e.g. the train driver or a person that directs and facilitates the movement of trains over an assigned territory, such as a rail traffic controller. If the sensor and control unit are mounted separately, the wireless transceiver may transmit acceleration data from the sensor to the control unit for further analysis and further transmit information from the control unit to e.g. the train driver. The wireless transceiver may for example be a GPRS-unit. However, an additional low-power local-area wireless network communication function, such as provided by the Bluetooth or Zigbee technologies, may also be used in order to provide communication with e.g. the train driver in the absence of GPRS coverage.

In embodiments of the second aspect, the system is further comprising a storage unit for storing the monitored acceleration data.

The system may thus basically gather accelerometer data and store the data in the storage unit, and further transmit the data via GPRS with the transceiver to the control unit when there is GPRS coverage. If GPRS communication cannot be established due to lack of GPRS coverage, the storage may store the acceleration data locally to be transmitted as soon as GPRS communication is established. Once data is transmitted successfully via GPRS, any data that has been stored in the storage unit may be deleted.

The storage unit may be a part of the control unit, and may be mounted together with the at least one sensor.

In embodiments of the second aspect, the system is further comprising at least one strain gauge.

This may give further information on other bogie operational defects,

The strain gauge may be mounted together with the at least one sensor

In embodiments of the second aspect, the system further comprises at least one GPS.

A system comprising a GPS would provide measurements with information about time and position of the railway wagon. The GPS may be mounted together with the sensor and/or control unit.

Further, a GPS may identify that sporadic acceleration is caused by a geographically fix spot, i.e. that it is caused by a "rail" flat or defect, as opposed to a wheel flat.

The system may also further comprise a temperature probe and/or a clock.

In embodiments of the second aspect, the system is furthermore arranged to perform preliminary data processing to determine critical and non-critical defects into three action related characteristics: 1) Imminent derailment danger, 2) maintenance needed before wagon can be put back in service and 3) maintenance action needed in the future.

The system may furthermore be arranged to, after preliminary data processing as described above, immediately send imminent derailment danger messages to the train driver in order for him to stop the train.

The system may furthermore be arranged to send the other two alert levels to a back office server for additional processing. The back office server may be arranged to prepare and send reports to customers or provide access to the data for their account over the internet. The back office server may furthermore be arranged to analyse, compare and/or combine the data with stored data relating to the same wagon, i.e. previous wagon history.

In embodiments of the back office server, it may be arranged to:

Receive and store acceleration and time stamp data, and optionally GPS data, from each train in a structured form.

Compile this information, by background processes, into sets of data that represent train or wagon specific information of interest, such as maximum acceleration levels and associated geographic position.

Trigger functions that warn the user e.g. in case of acceleration levels in excess of a given threshold, a wheel set in excess of a given mileage or repeated acceleration peaks at a certain geographic position.

In embodiments of the second aspect, the system functions may be described as:

Acceleration measurement in 3 dimensions at 12 Hz intervals, with time stamp.

Digital Signal Processing of the acceleration measurements such as thresholding, averaging as well as frequency analysis.

Potential for integrating further sensor modules, such as a GPS module or temperature sensor.

Secure wireless communication via for example GPRS.

Continually storing, by the CPU, of each accelerometer measurement to a local memory, for example a local flash memory in the format of a RAM-disk.

Connection, by separate CPU process(es), to the GPRS network at predetermined intervals, for example every 15 minutes. If the connection is successful, data may be packaged and encrypted and then transmitted to a back office server. If a receipt is received from the back office server that the transmission has been successful, the corresponding data is removed from the local memory. If connection either cannot be established, or a transmission attempt is unsuccessful, data is kept until the next transmission attempt, i.e. for example 15 minutes later.

As a third aspect of the invention, there is provided a railway wagon comprising at least one system according to the second aspect, wherein the at least one system is mounted on the sprung part of the railway wagon.

The third aspect thus provides a railway wagon in which the wheel flat size may be monitored in convenient ways using the system as disclosed in relation to the second aspect above.

The present invention further provides the use of a system according to the second aspect above for detection and analysis of other bogie operational defects, such as derailment, bogie hunting or stuck brakes or for detection and analysis of broken rail, rail defects or sun kinks.

As a fourth aspect of the invention, there is provided the use of at least one acceleration sensor mounted on the sprung part of a railway wagon for estimating the wheel flat size of a wheel of the railway wagon.

The terms and definitions used in relation with the fourth aspect are as defined in relation to the other aspects of the invention above.

As discussed above, the inventors have found that it is advantageous to measure the acceleration on the sprung part of the wagon, since it requires less rugged measurement equipment and facilitates installation considerably.

In embodiments of the fourth aspect, the at least one acceleration sensor is adapted to monitor the acceleration along three mutual orthogonal axes.

BRIEF DESCRIPTION OF THE DRAWINGS

FIGS. 6a-f show example acceleration level measurements performed on a sprung railway wagon structure with and without wheel flats.

FIGS. 7a-f show histogram plots of the acceleration level measurements shown in FIGS. 6a-f.

DETAILED DESCRIPTION OF THE INVENTION AND SCENARIOS

Figure 1:
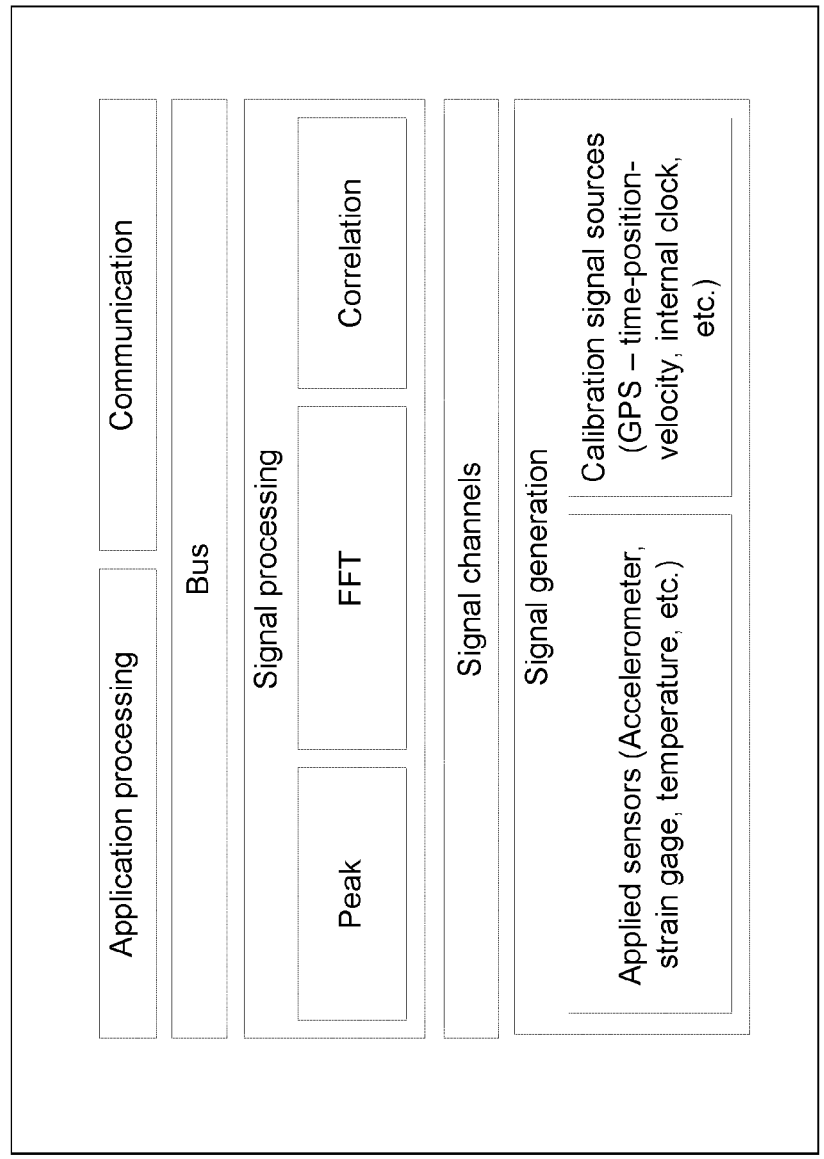
FIG. 1 shows the high-level architecture of a system according to the present disclosure. FFT—Fast Fourier Transform, GPS—Global Positioning System.

FIG. 1 shows a high level architecture of a system according to the present disclosure. The system may warn against defects as derailment, wheel flats, indicate wheel flat size, warn against hunting, damage to other rail car components, rail defects, and severe defects in the suspension system of an individual railway wagon.

The signal generation may comprise sensors such as at least one accelerometer and strain gauges for monitoring the acceleration and vibrations. The at least one accelerometer monitors acceleration in three dimensions continually and real-time analysis of such acceleration data identifies signatures for the defects mentioned above. Depending on problem type and severity a warning is communicated to the train driver or a train dispatcher. Sensors for temperature etc. may also be included in the system if required.

The signal generation may also include calibration signal sources, such as from a GPS (time-velocity-position) etc. Further, amplifiers may be included to amplify one or several of the individual signals in the signal channels, as well as low pass filters to purify the signals and to eliminate high frequency data (normally above 10 Hz), which do not contain enough energy to be damaging. Moreover, analogue-to-digital converters, ADCs, may be included for analogue to digital conversion, which may be useful for analysis in the digital domain.

The signal processing may include Peak and Hold circuits which measure peak values over predetermined intervals over the complete low pass regime. The signal processing may also comprise Fast Fourier Transforming (FFT)-circuits that permit analysis of forces at preselected frequencies. Further, the signal processing may comprise correlator circuits that permit isolation and amplification of forces that are only of significance if detected from more than one source simultaneously. A multiplexer, MUX, may also be required to permit sending information from a number of inputs through a single channel.

The signal processing and application processing may be performed in a control unit. The application processing may comprise a micro-controller which does the preliminary data processing, utilising proprietary algorithms, which may be required for information to be sent directly to the train driver. It may also do preliminary processing of data to be sent to a central server for more sophisticated analysis using additional proprietary algorithms.

The communication unit may include a wireless transceiver (transmitter amplifier and antenna) for transmission of data to the train driver or an external computer system.

Figure 2:
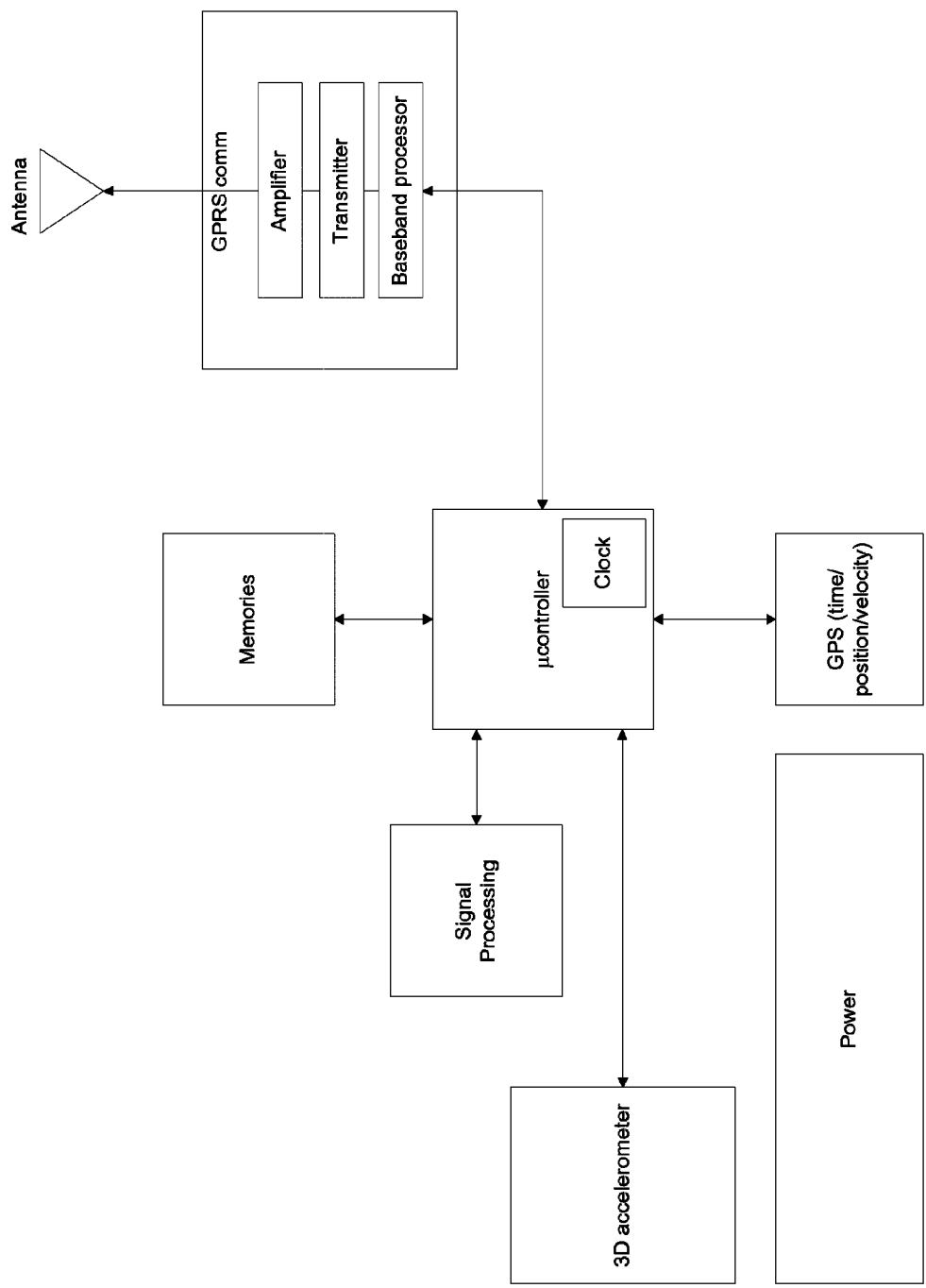
FIG. 2 shows the functional components of a system according to an embodiment of the present disclosure.

FIG. 2 shows the functional components according to an embodiment of the present disclosure.

The sensor comprises a 3D accelerometer with a lateral sensitivity of 0.1-3.0 g, a longitudinal sensitivity of 0.1-3.0 g and a vertical sensitivity of 0.1-3.0 g. The resolution of the acceleration measurements is 0.02 g and the sampling interval is about 50-100 ms.

The system further comprises a control unit comprising a microprocessor connected to a storage unit (denoted "memories") as well as a signal processing unit for processing the monitored acceleration signals. A GPS is also connected to the microprocessor to log the time and position of the monitored acceleration data. The microprocessor analyses processed acceleration signals and compares them with pre-defined values or functions in order to decide whether or not a wheel flat has developed and the wheel flat size. The information is sent with a transceiver, in this case a GPRS unit (comprising a baseband processor, a, transmitter, an amplifier and an antenna) e.g. to the train driver.

Figure 3:
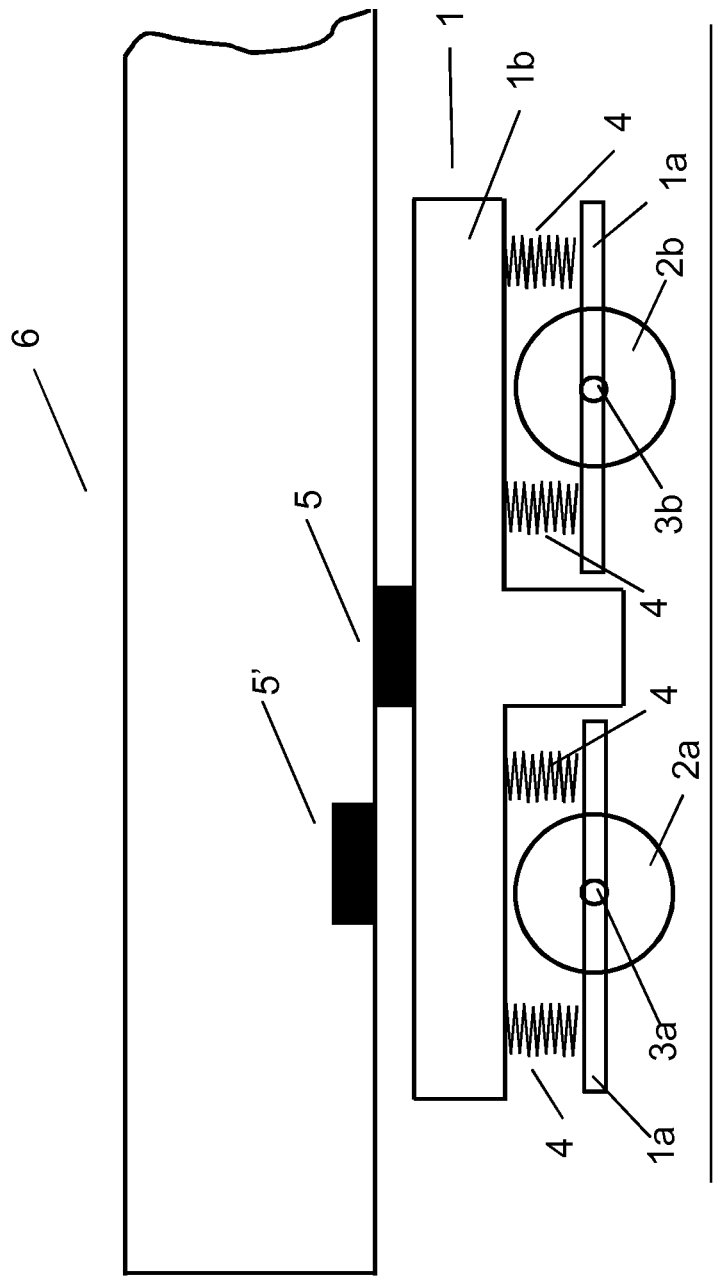
FIG. 3 shows schematic drawing of a railway wagon with a sensor mounted on the sprung part.

FIG. 3 shows a schematic drawing of a part of a railway wagon comprising a bogie 1. The bogie 1 comprises unsprung bogie structures 1a and a sprung bogie structure 1b, which is in sprung connection 4 with the wheel pairs 2a and 2b, mounted on axles 3a and 3b. The acceleration sensor, control unit and transceiver may be mounted as a single package 5 by steel fitting with guides, welded to the central part of the sprung part of the bogie 1b, or mounted by means of strong magnets. The acceleration sensor, control unit and transceiver may also be mounted as a single package 5' inside the actual wagon 6, such as close to the floor of the actual wagon 6.

The following examples further explain how the system of the present disclosure system functions in different scenarios:

Scenario 1: Derailing

The train driver conducts a freight train along the main line. Each wagon of the freight train is equipped with two systems of the present disclosure, mounted close to each bogie, on the sprung part of each wagon. After passing a junction, a wagon axle in a monitored bogie structure derails. The increased acceleration forces that result from the wheel derailment will exceed a pre-defined level. This event is identified by the system.

Scenario 2: Wheel Flat

The train driver conducts a freight train along the main line. Each wagon of the freight train is equipped with two systems of the present disclosure, mounted close to each bogie, on the sprung part of each wagon. Each system continually transfers acceleration measurements to a central server via GPRS. In the absence of GPRS coverage the measurements are stored in a storage unit for later transfer to the server. A stop signal causes the train driver to brake the train. During the brake event, one brake in a monitored bogie structure accidentally locks and the braked wheel loses adhesion to the track. The friction that develops between the wheel and the track creates a wheel flat. The train comes to a halt. After a while the line is clear and the train driver accelerates the train. The increased acceleration forces that result from the wheel flat will exceed a pre-defined level. This event is identified by the system.

The following scenarios further illustrates how different operational defects may be detected:

Scenario 3: Broken Rail or Rail Defects

The broken rail signature may produce vertical acceleration levels that are comparable to what is seen when a wheel flat occurs, or in severe cases larger or much larger levels than what is seen when a wheel flat occurs. However, additional geo-position information may be used to discriminate between the two damaging events:

If a single sensor unit measures vertical acceleration levels that repeatedly are above a certain damaging level, this may be indicative of a wheel flat.

If a single sensor unit measures only one or a few vertical acceleration levels above a certain damaging level, this may be indicative of a rail defect. In particular, if other units, such as units mounted on other trains, sense comparable levels at the same geo-positional point at another point in time, this is a strong indication of a rail defect.

Rail defects tend to occur as a train passes. A train that is equipped with acceleration sensors in front and back will then be able to detect also when in time a rail defect occurs, as the front sensors will sense no acceleration event, whereas the back sensors will sense an acceleration event.

Scenario 4: Bearing Faults

Bearing faults may increase bearing temperature. Bearing temperature can be sensed using e.g. a single photometric cell that derives temperature by fitting measurements at a number of infra red frequencies to a black body spectrum. Temperatures that lie outside a normal range, i.e. may be indicative of a bearing fault, may be identified by either their absolute levels, or by comparing a number of bearing temperatures as measured on a single bogie or wagon.

Alternatively, bearing faults may be detected using acoustic measurements. Acoustic signals originating from the bearing may be measured using a microphone or other acoustic measurement means. The acoustic signals may be used as an indicator for an intermediate or non-critical warning level. It may be advantageous to receive such an intermediate or non-critical warning level in order to preventively replace a deteriorating bearing before sending a railway wagon on a long trip. Acoustic signals that lie outside a normal range may be indicative of a bearing fault, and may be identified by either their absolute levels, or by comparing a number of acoustic signals as measured on a single bogie or wagon.

Scenario 5: Sun Kinks

A sun kink refers to bucklings in the rail track that may occur on hot days, i.e. when the temperature of the rail track is increased. The phenomenon may be detected by the device, e.g. by detecting lateral accelerations above a specific threshold in several railroad wagons in a single train, such as a in several railroad wagons in a row. Consequently, a train may be equipped with several systems according to the present disclosure.

Scenario 6: Hunting

Hunting oscillation is an unwanted swaying motion of a railway wagon or bogie, i.e. an unwanted lateral oscillating movement. Such oscillation may occur if the railway wagon or bogie travels at too high speed, i.e. above a critical speed. If the wheels are defect in the sense that they have reduced degree of taper or conicity and/or reduced flange thickness, hunting oscillation may occur also at lower speeds. This event may be identified by the system by monitoring at least the lateral acceleration in a specific railway wagon, and conclude that a wheel defect has occurred if a specific acceleration pattern is monitored. The acceleration pattern may comprise a lateral acceleration above a first threshold.

EXAMPLES

The following examples further show in detail how an acceleration signal may be processed in order to identify and estimate defects such as the wheel flat size.

1. Detecting Wheel Flats by Means of On-Board Acceleration Analysis

A simplistic kinematic analysis follows that tries to identify how a wheel flat manifests itself through acceleration. No dynamic effects are taken into account, e.g. acceleration leading to the wheel loosing contact with the rail.

1.1 Frequency/Duration

A wheel diameter of 0.920 m (2.89 m circumference) at a speed of 50 to 90 km/h (13.9 to 25 m/s) yields a wheel rotation frequency of 5 to 9 Hz, corresponding to a time period T of 200 to 111 ms. Doubtless there tend to be numerous other wheel or axis defects that manifest themselves around these frequencies, the first-order frequency of wheel rotation.

One possible wheel flat characteristic may be the amount of acceleration experienced in total over one wheel rotation, another may be the peak acceleration experienced over one wheel rotation. Assuming a wheel flat size of 5 cm length, acceleration will mainly occur over a fraction 0.05/2.89=1.7% of one wheel rotation, roughly 200*0.017–111 *0.017=3.4–1.9 ms.

The signal amplitude needs to be stronger than the tolerance for other first order wheel or axis defects. It may thus be preferred that the sensor is responsive in the interval 5-9 Hz and in the acceleration regime experienced.

1.2 Amplitude

Figure 4:
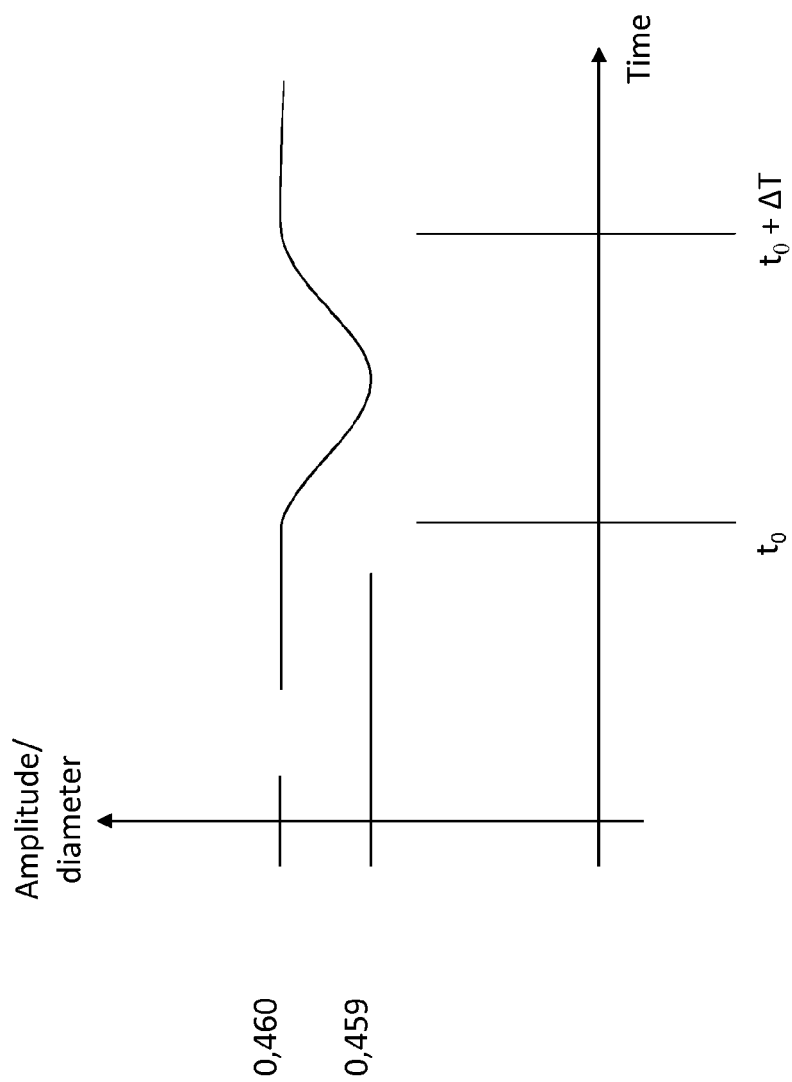
FIG. 4 shows a sinusoidal wheel displacement over the wheel flat.

Assuming that a wheel flat size corresponds to 1 mm abrasion/wear at the deepest spot, i.e. the diameter of the wheel is at most reduced by 1 mm, the wheel axle is displaced by 1 mm over time $\Delta T=3.4-1.9$ ms. FIG. 4 shows the sinusoidal wheel axle displacement over the wheel flat $$D(t)=0.460 (0 \le t+t_0 < t_0 \text{ or } t_0+\Delta T \le t+t_0 < T) \text{ [m]}$$

$$D(t)=0.460-0.0005*(1-\cos(2\pi t/\Delta T))(t_0 \le t+t_0 < t_0+\Delta T) \text{ [m]}$$

$$D'(t)=0 (0 \le t+t_0 < t_0 \text{ or } t_0+\Delta T \le t+t_0 < T) \text{ [ms}^{-1}]$$

$$D'(t)=-0.0005*2\pi/\Delta T*\sin(2\pi t/\Delta T)(t_0 \le t+t_0 < t_0+\Delta T) \text{ [ms}^{-1}]$$

$$D''(t)=0 (0 \le t+t_0 < t_0 \text{ or } t_0+\Delta T \le t+t_0 < T) \text{ [ms}^{-2}]$$

$$D''(t)=-0.0005*4\pi^2/\Delta T^2*\cos(2\pi t/\Delta T)(t_0 \le t+t_0 < t_0+\Delta) \text{ [ms}^{-2}]$$

Vertical acceleration will then follow $$Q(t)=D''(t)=0 (0 \le t+t_0 < t_0 \text{ or } t_0+\Delta T \le t+t_0 < T) \text{ [ms}^{-2}],$$

$$Q(t)=D''(t)=-0.0005*4\pi^2/\Delta T^2*\cos(2\pi t/\Delta T)(t_0 \le t+t_0 < t_0+\Delta T) \text{ [ms}^{-2}].$$

It is to be noted that these levels apply to the unsprung part of the bogie.

Under these assumptions, the maximum acceleration experienced will be $$0.0005*4*3.14*3.14/(0.0034*0.0034)=1700 \text{ ms}^{-2}=170 \text{ g}.$$

Thus, this model indicates that, should a wheel flat develop, acceleration levels of the unsprung parts of the railway wagon may reach 100 g, as compared to experienced accelerations of up to a few g, such as 0-2.0 g, on the sprung parts of a railroad wagon.

1.3. Acceleration Level Estimates

Figure 5:
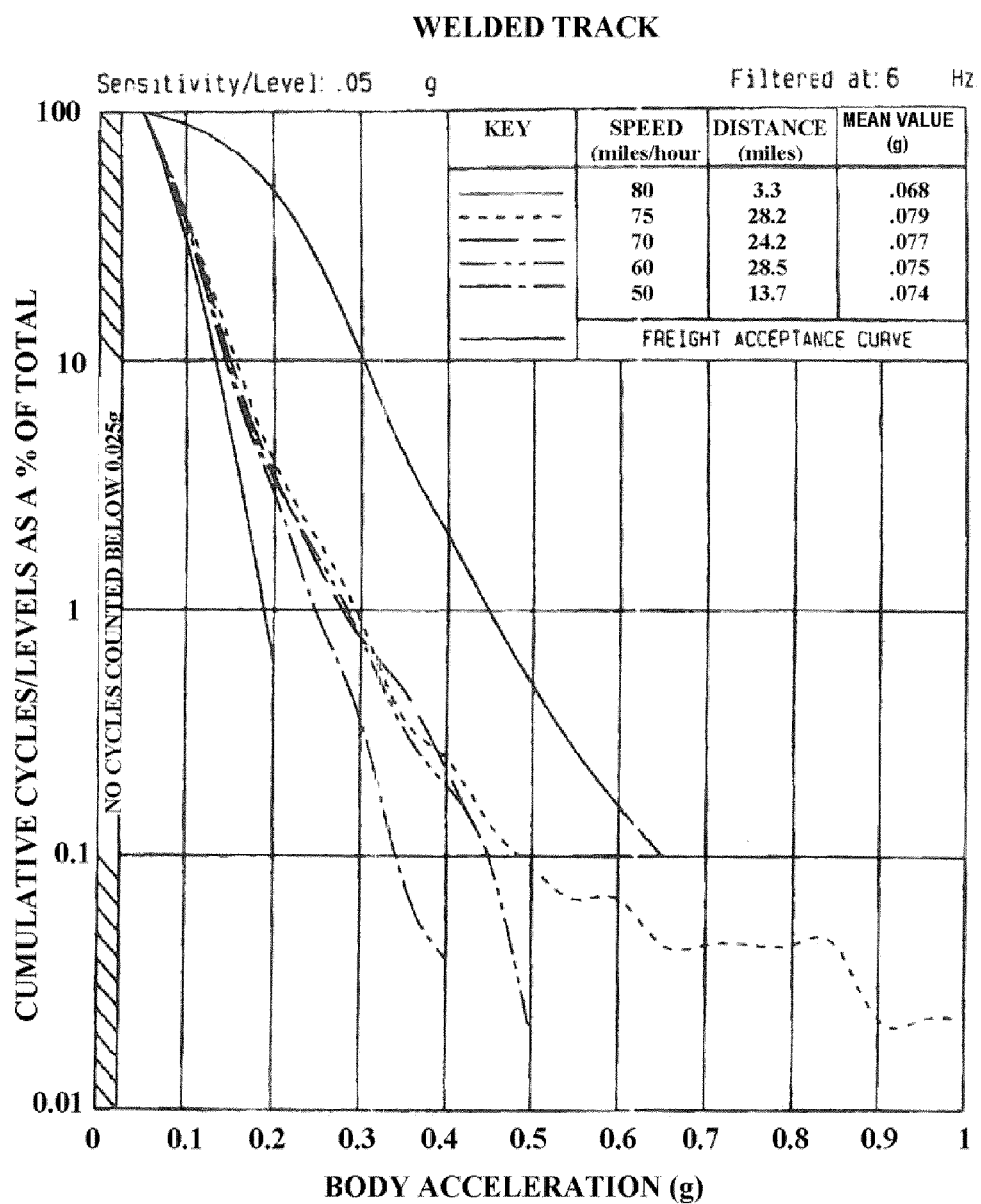
FIG. 5 shows example acceleration level measurements performed on a sprung railway wagon structure.
Figure 5:
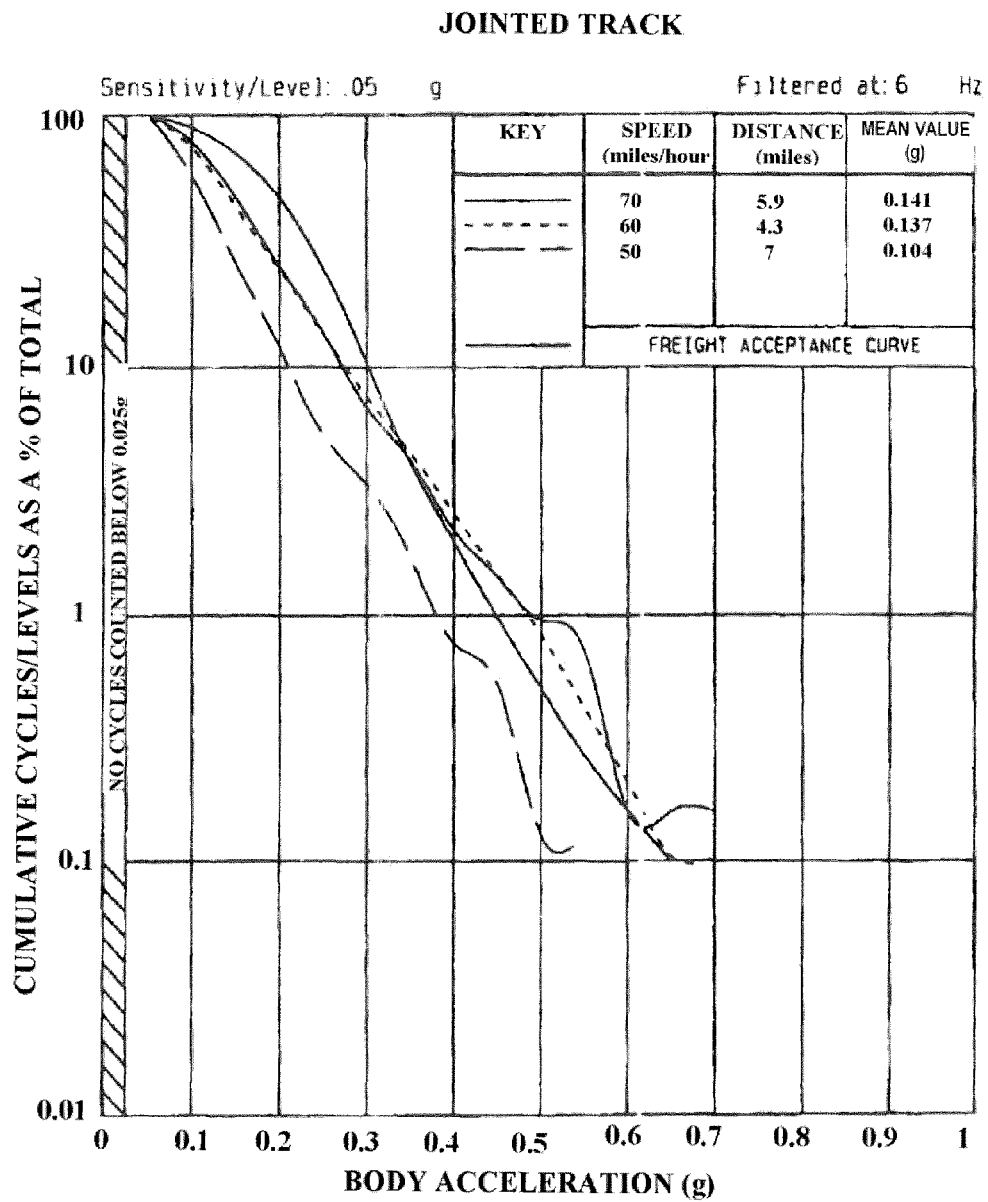

Acceleration level measurements were performed on a sprung railway wagon structure. The specified system performance with respect to acceleration measurement is pictured in FIG. 5. The accumulated percentage of measurements is plotted against the absolute acceleration force measured. The measurement unit is g. As seen in the plots, 100% of the measurements give 0 g or more, few measurements give 0.5 g or more. The example illustrates the difference in acceleration levels between welded track (left), that simulates a situation without a wheel flat, and jointed track (right), which simulates the situation with a wheel flat. Consequently, the acceleration on the sprung parts of a railway wagon tends to fluctuate up to roughly 1.0 g, as compared to the 30-100 g that is experienced directly at the wheel against the railroad track (see 1.2 above).

Figures 6C, 6D:
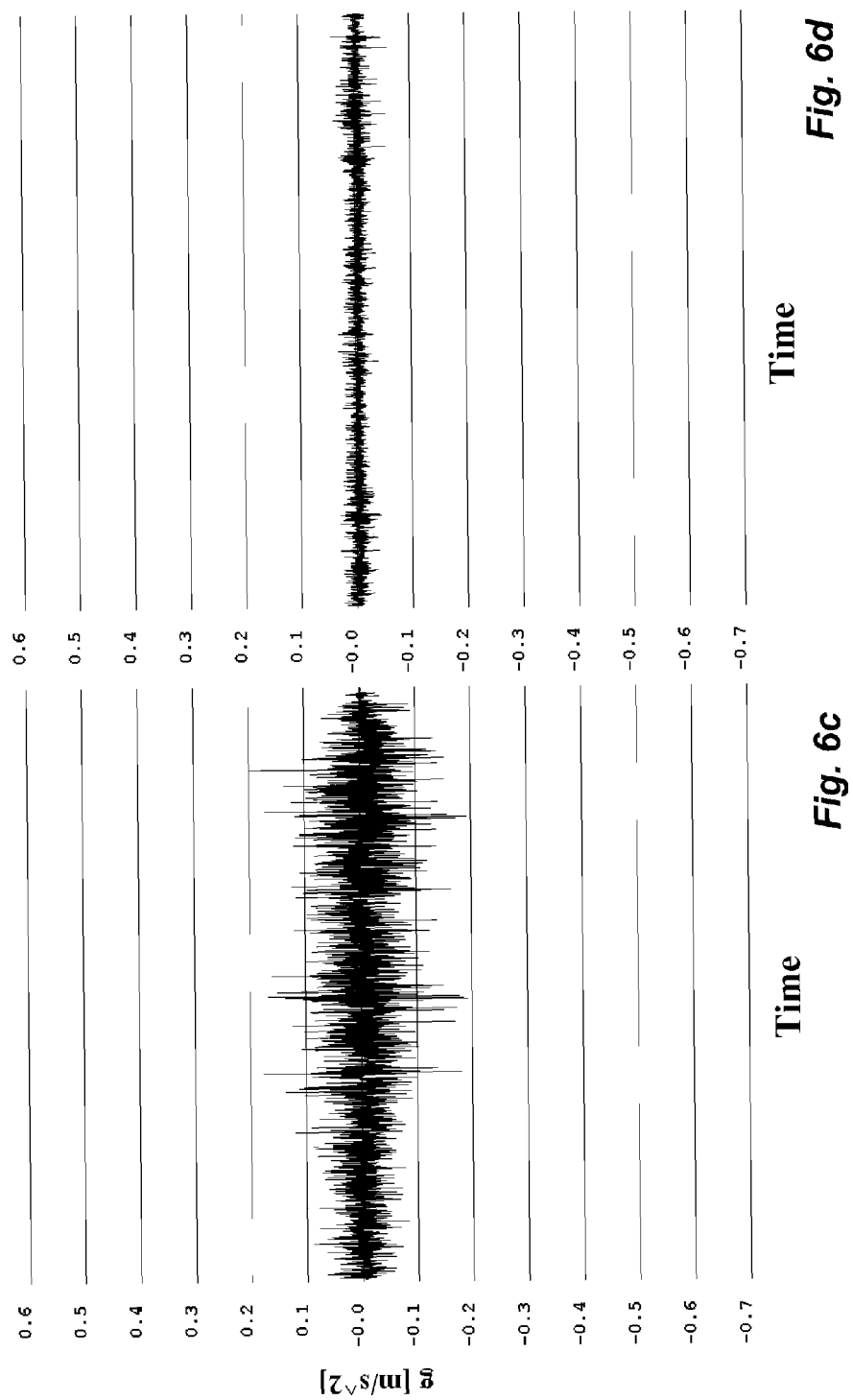
Figure 7C:
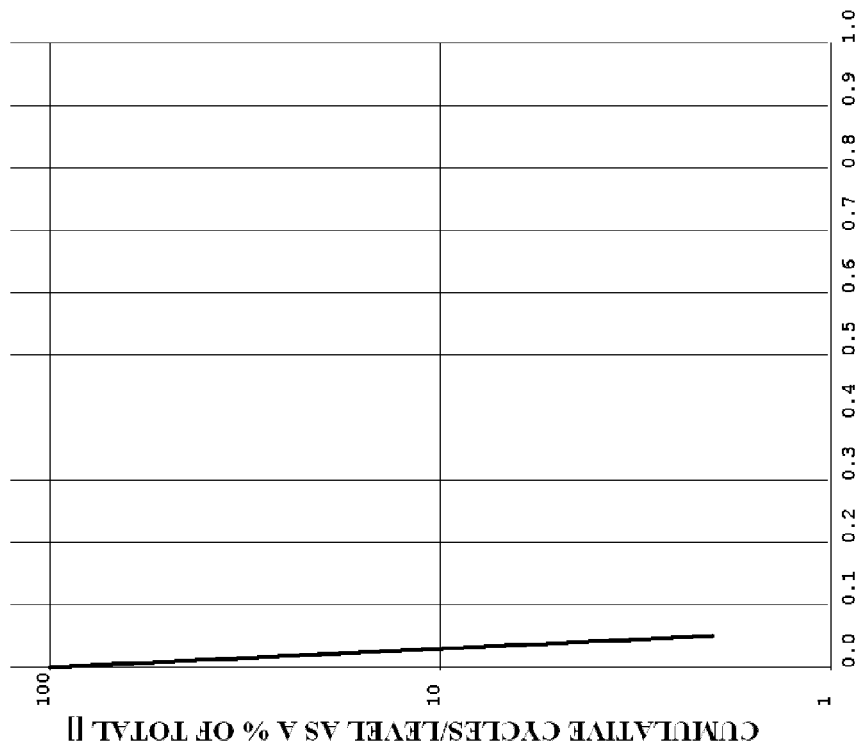
Figure 7D:
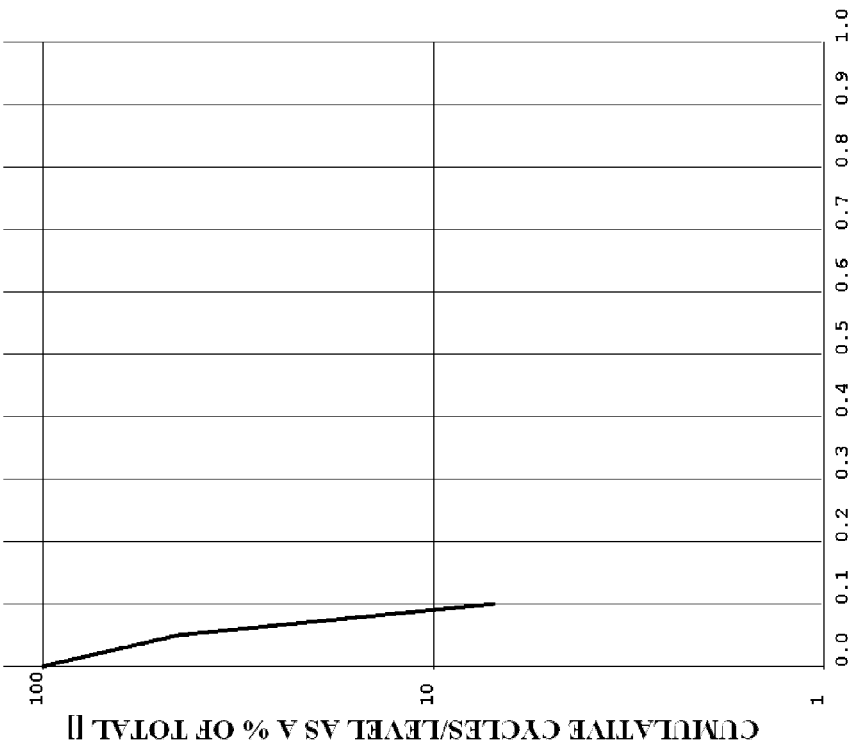
Figure 7E:
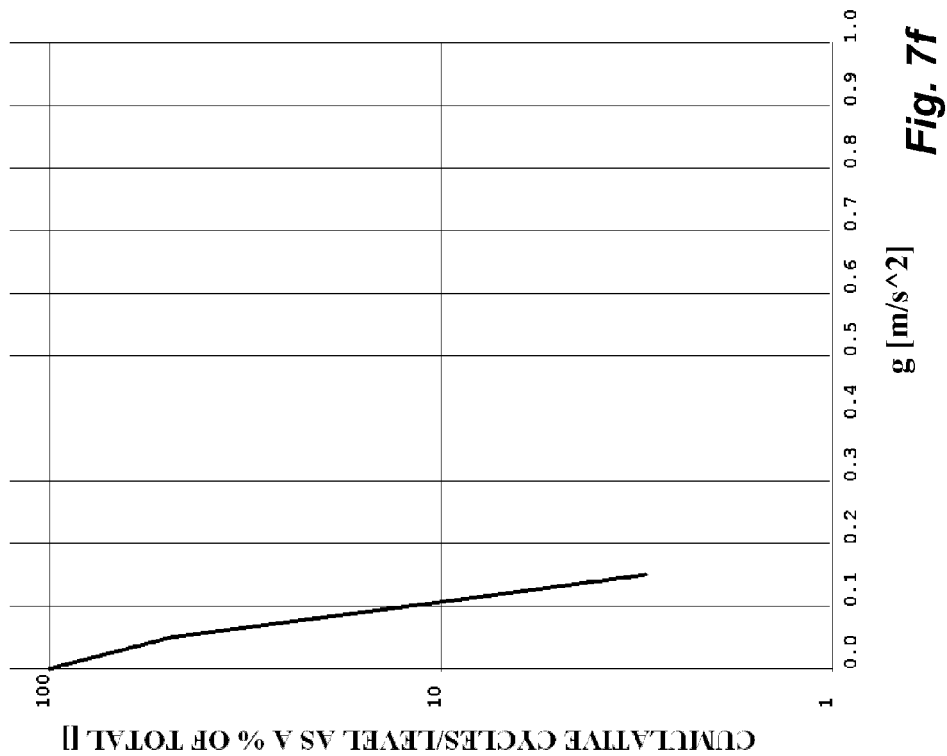
Figure 7F:
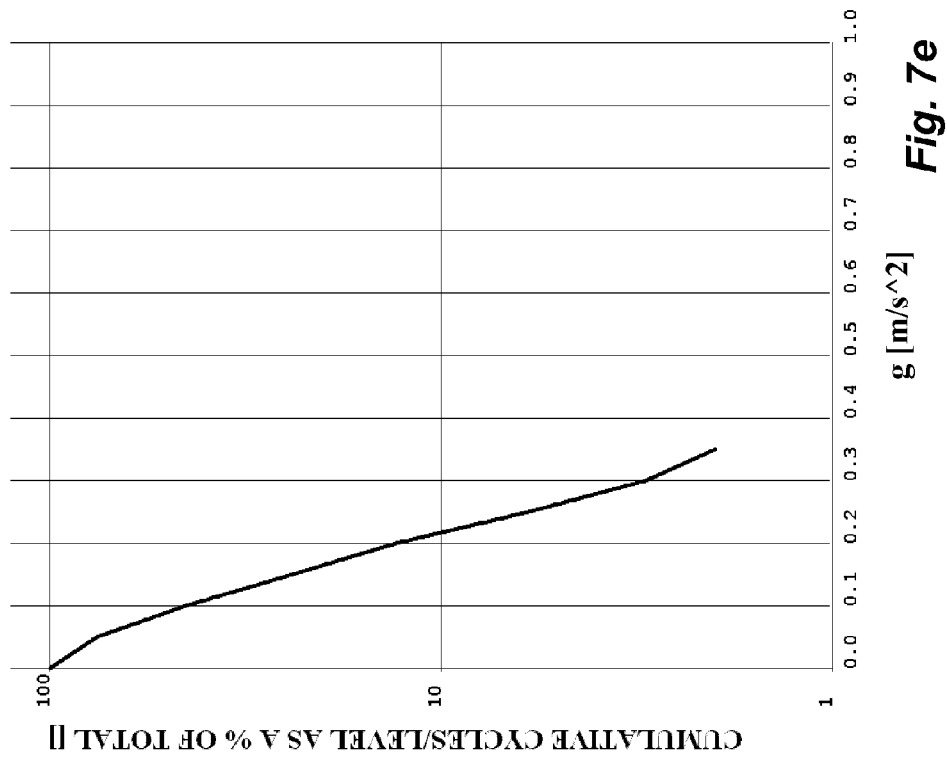

Numerous comparative tests of acceleration levels have been conducted in-yard as well as on the main line. Acceleration levels were gathered at various speeds, from wagons of similar type, some with pronounced wheel flats, loaded as well as unloaded. The measurement equipment was mounted on the sprung part of the respective wagon, close to one of the wagon bogies. Acceleration data was measured at 12 Hz intervals in three dimensions, and transmitted continuously every 15 minutes via GPRS to a back-office server function. Test time durations were up to several hours. The results are shown in FIGS. 6a-f and 7a-f. FIGS. 6a, 6c, and 6e show time resolved lateral, longitudinal and vertical acceleration level measurements, respectively, on wagons with wheel flats. FIGS. 7a, 7c and 7e show corresponding histogram plots. FIGS. 6b, 6d, and 6f show time resolved lateral, longitudinal and vertical acceleration level measurements, respectively, on wagons without wheel flats. FIGS. 7b, 7d and 7f show corresponding histogram plots. A clear increase in vertical acceleration levels is measured in the case of a wheel flat (compare FIGS. 6e and 7e with FIGS. 6f and 7f). It can be concluded that an increase in z-level acceleration levels, as measured on the sprung part of the wagon, is indicative of a wheel flat.

Although exemplary embodiments of the present invention have been shown and described, it will be apparent to the person skilled in the art that a number of changes and modifications, or alterations of the invention as described herein may be made. For example, the monitored accelerations may be used to conclude that defects, similar to but other than explicitly disclosed above, have occurred by detecting a specific acceleration pattern. Furthermore, the same acceleration sensors may be used to detect several types of defects, as described above. Alternatively, a plurality of systems may be used on each wagon for detection of several defects. It is to be understood that the above description of the invention and the accompanying drawings are to be regarded as non-limiting examples thereof and that the scope of the invention is defined in the appended patent claims.

The invention claimed is:

1. A method for detecting a wheel flat, or an event that may cause a wheel flat to develop, in a railway wagon, comprising the steps of
    a) monitoring at least longitudinal and vertical accelerations of said railway wagon, and
    b) concluding that a wheel flat has developed, or that there is a risk of developing a wheel flat, if a specific acceleration pattern is monitored, said pattern comprising a longitudinal acceleration above a first threshold followed by a vertical acceleration above a second threshold.

2. A method according to claim 1, wherein the longitudinal and vertical accelerations of step a) are monitored on a sprung part of said railway wagon.

3. A method according to claim 1, further comprising the step of
    c) estimating a size of said wheel flat by comparing at least one monitored acceleration of step a) with predefined criteria that correspond to different wheel flat sizes.

4. A method according to claim 3, wherein the vertical acceleration is compared in step c) with predefined criteria that correspond to different wheel flat sizes.

5. A method according to claim 3, wherein step a) comprises monitoring acceleration along three mutual orthogonal axes of said railway wagon, wherein two of said axes correspond to the vertical and longitudinal acceleration, respectively, and further estimating the absolute value of an acceleration vector from the monitored acceleration, and step c) comprises estimating the size of said wheel flat by comparing the estimated acceleration vector of step a) with predefined criteria that correspond to different wheel flat sizes.

6. A method according to claim 1, further comprising using at least one acceleration sensor mounted on a sprung part of a railway wagon for estimating a wheel flat size of a wheel of the railway wagon.

7. The method according to claim 6, wherein the at least one acceleration sensor is configured to monitor acceleration along three mutual orthogonal axes.

8. A system for detecting a wheel flat of at least one wheel of a railway wagon, or an event that may cause a wheel flat to develop, comprising
    at least one sensor for monitoring at least longitudinal and vertical accelerations of said railway wagon, and
    a control unit configured to detect a specific acceleration pattern, the acceleration pattern comprising a longitudinal acceleration above a first threshold, followed by a vertical acceleration above a second threshold.

9. A system according to claim 8, wherein the at least one sensor is configured to measure acceleration levels of up to 3.0 g.

10. A system according to claim 8, wherein the at least one sensor has a bandwidth of about 10 Hz.

11. A system according to claim 8, wherein the at least one sensor is configured to be mounted on a sprung part of said railway wagon.

12. A system according to claim 11, wherein the at least one sensor is configured to measure acceleration levels of about 0 g to 2.0 g.

13. A system according to claim 8, further comprising at least one GPS receiver.

14. A railway wagon comprising at least one system according to claim 8, wherein the at least one sensor of the at least one system is mounted on a sprung part of said railway wagon.

15. A system according to claim 8, wherein the system is configured for detection and analysis of other bogie operational defects.

16. A method for detecting a wheel flat, or an event that may cause a wheel flat to develop, in a railway wagon, comprising the steps of
    a) monitoring at least a longitudinal acceleration and a vertical acceleration of the railway wagon, and b) determining that a wheel flat has developed, or that there is a risk of developing a wheel flat, when a specific acceleration pattern is detected, wherein the specific acceleration pattern comprises a longitudinal acceleration that exceeds a first threshold, the longitudinal acceleration representing formation of the wheel flat, and a vertical acceleration that exceeds a second threshold immediately following the longitudinal acceleration, the vertical acceleration representing a formed wheel flat.

* * * * *